United States Patent
Tsubaki et al.

(10) Patent No.: US 9,316,546 B2
(45) Date of Patent: Apr. 19, 2016

(54) TEMPERATURE SENSOR AND TEMPERATURE SENSOR ATTACHING STRUCTURE

(71) Applicant: Murata Manufacturing Co., Ltd., Nagaokakyo-shi, Kyoto-fu (JP)

(72) Inventors: Shuji Tsubaki, Nagaokakyo (JP); Takeo Haga, Nagaokakyo (JP); Kazuto Miyagawa, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 319 days.

(21) Appl. No.: 13/933,349

(22) Filed: Jul. 2, 2013

(65) Prior Publication Data
US 2013/0288091 A1    Oct. 31, 2013

Related U.S. Application Data

(63) Continuation of application No. PCT/JP2011/079137, filed on Dec. 16, 2011.

(30) Foreign Application Priority Data

Jan. 7, 2011   (JP) ................. 2011-002570
Jan. 7, 2011   (JP) ................. 2011-002571
Jan. 7, 2011   (JP) ................. 2011-002572
Jan. 14, 2011  (JP) ................. 2011-006306

(51) Int. Cl.
*H01M 10/48* (2006.01)
*G01K 7/22* (2006.01)
*G01K 1/14* (2006.01)
*G06K 19/077* (2006.01)

(52) U.S. Cl.
CPC .. *G01K 7/22* (2013.01); *G01K 1/14* (2013.01); *G06K 19/07749* (2013.01); *H01M 10/486* (2013.01)

(58) Field of Classification Search
None
See application file for complete search history.

(56) References Cited

U.S. PATENT DOCUMENTS 5,066,938 A    11/1991  Kobashi et al.
5,362,966 A *  11/1994  Rosenthal et al. ......... 250/341.1
(Continued)

FOREIGN PATENT DOCUMENTS

CN    101582651 A    11/2009
JP    03-131003 A    6/1991
(Continued)

OTHER PUBLICATIONS

Official Communication issued in International Patent Application No. PCT/JP2011/079137, mailed on Jan. 24, 2012.

*Primary Examiner* — Patrick Ryan
*Assistant Examiner* — Jose Colucci Rios
(74) *Attorney, Agent, or Firm* — Keating & Bennett, LLP

(57) ABSTRACT

A flexible board includes a base layer, a wiring conductor layer that is located on the base layer, and a cover layer that is stacked over the base layer and covers the wiring conductor layer. A portion of the wiring conductor layer defines connecting portions that connect each of split electrodes of a flexible thermistor. The cover layer includes an opening that exposes the connecting portions, and receives the flexible thermistor. The split electrodes of the flexible thermistor are mounted on the connecting portions of the wiring layer. The height of the exposed surface of the flexible thermistor from the opening is substantially equal to the height of the surface of the cover layer.

20 Claims, 12 Drawing Sheets

(56) References Cited

U.S. PATENT DOCUMENTS

| | | | |
|---|---|---|---|
| 5,451,806 A | 9/1995 | Davies | |
| 7,059,769 B1* | 6/2006 | Potega | 374/185 |
| 2008/0093226 A1* | 4/2008 | Briman et al. | 205/775 |
| 2009/0283765 A1 | 11/2009 | Onishi et al. | |
| 2010/0300708 A1* | 12/2010 | Raphael et al. | 169/54 |

FOREIGN PATENT DOCUMENTS

| | | |
|---|---|---|
| JP | 2528396 Y2 | 3/1997 |
| JP | 2001-194247 A | 7/2001 |
| JP | 3667099 B2 | 7/2005 |
| JP | 2010-015914 A | 1/2010 |

\* cited by examiner

FIG. 20
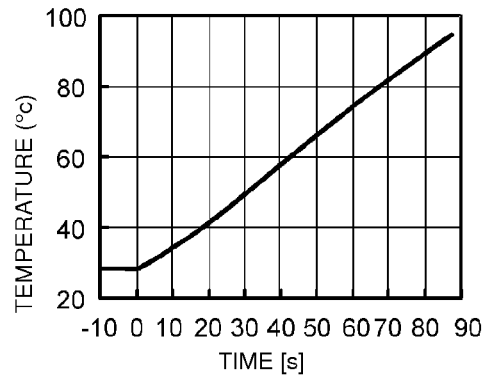
FIG. 21A
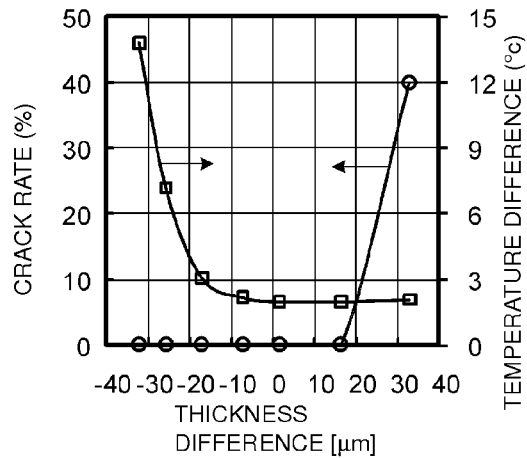
FIG. 21B
| | THICKNESS DIFFERENCE Te[μm] | RATIO TO THICKNESS OF FLEXIBLE BOARD [%] | CRACK RATE AFTER HEAT SHOCK TEST (EVALUATION 1) [%] | TEMPERATURE DIFFERENCE FROM TEMPERATURE DETECTION OBJECT (EVALUATION 2) ΔT [°C] |
|---|---|---|---|---|
| COMPARATIVE CONDITION | -32 | -42 | 0 | 13.8 |
| COMPARATIVE CONDITION | -26 | -34 | 0 | 7.2 |
| EXAMPLE (4) | -17 | -22 | 0 | 3.1 |
| EXAMPLE (3) | -7 | -9 | 0 | 2.2 |
| EXAMPLE (1) | 2 | 2 | 0 | 2.0 |
| EXAMPLE (2) | 16 | 21 | 0 | 2.0 |
| COMPARATIVE CONDITION | 33 | 43 | 40.0 | 2.1 |

FIG. 22A
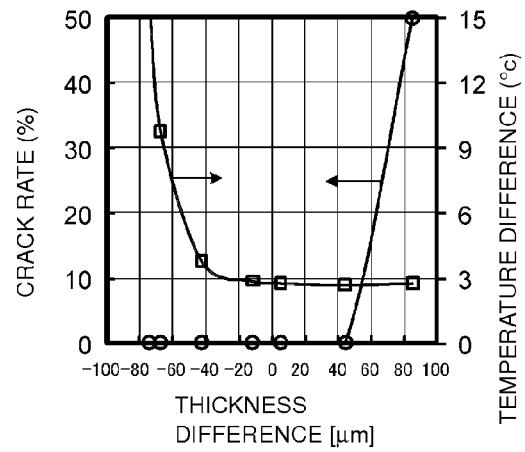
FIG. 22B
| | THICKNESS DIFFERENCE Te[μm] | RATIO TO THICKNESS OF FLEXIBLE BOARD [%] | CRACK RATE AFTER HEAT SHOCK TEST (EVALUATION 1) [%] | TEMPERATURE DIFFERENCE FROM TEMPERATURE DETECTION OBJECT (EVALUATION 2) ΔT [°C] |
|---|---|---|---|---|
| COMPARATIVE CONDITION | -75 | -36 | 0 | 16.2 |
| COMPARATIVE CONDITION | -68 | -32 | 0 | 9.8 |
| EXAMPLE (14) | -43 | -20 | 0 | 3.8 |
| EXAMPLE (13) | -12 | -6 | 0 | 2.9 |
| EXAMPLE (11) | 5 | 2 | 0 | 2.8 |
| EXAMPLE (12) | 44 | 21 | 0 | 2.7 |
| COMPARATIVE CONDITION | 85 | 40 | 50.0 | 2.8 |
FIG. 23
Prior Art
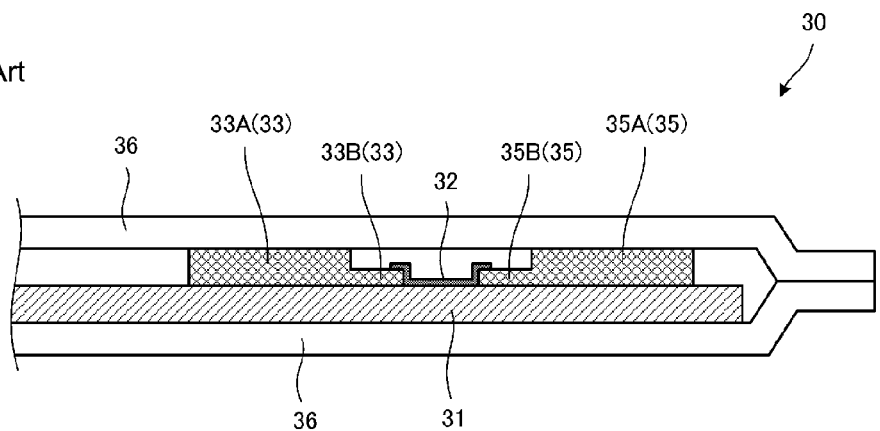

TEMPERATURE SENSOR AND TEMPERATURE SENSOR ATTACHING STRUCTURE

BACKGROUND OF THE INVENTION

1. Field of the Invention

The present invention relates to a temperature sensor and a temperature sensor attaching structure.

2. Description of the Related Art

In the related art, as devices become thinner and smaller, there are an increasing number of cases where a thermistor element used as a temperature sensor is mounted on a flexible board. For example, Japanese Unexamined Patent Application Publication No. 2010-015914 discloses a configuration in which a thermistor element is arranged on a flexible board.

FIG. 23 is a cross-sectional view of a sensor unit 30 that detects the temperature of a power generating element disclosed in Japanese Unexamined Patent Application Publication No. 2010-015914. The sensor unit 30 has a flexible board 31, and a thermistor element (temperature information detecting element) 32 and signal lines 33 and 35 which are formed on the surface of the flexible board 31. The flexible board 31 is covered by protective films 36. That is, the flexible board 31 including the thermistor element 32 and the signal lines 33 and 35 is sandwiched by two sheet-like protective films 36, and the outer edge portions of the two protective films 36 are secured to each other.

The sensor unit according to Japanese Unexamined Patent Application Publication No. 2010-015914 mentioned above is formed by arranging a thin temperature information detecting element on the flexible board, and assembling the resulting structure into a unit, with a view to detecting the temperature of the power generating element with greater accuracy while limiting the stress load applied to the power generating element.

However, the characteristic feature of the sensor unit according to Japanese Unexamined Patent Application Publication No. 2010-015914 resides in that the temperature information detecting element is connected to a connecting portion where the thickness in the board thickness direction of the flexible board is partially reduced. This temperature information detecting element itself has no flexibility. Therefore, even if the temperature information detecting element is formed of a thin film, a crack develops in the temperature information detecting element itself when a load is applied to the temperature information detecting element. In this case, the temperature information detecting element no longer functions as a temperature sensor. Moreover, because the temperature information detecting element is received inside the flexible board, the temperature information detecting element does not directly contact a temperature detection object, resulting in poor heat conduction. Therefore, it is difficult to directly detect the heat of the detection object. The deterioration of detection accuracy becomes particularly pronounced in a case where the temperature detection object generates only a small amount of heat.

It is also conceivable to mount a commonly used chip component on the flexible board, for example. However, such the commonly used chip component, even that which is handled as a small-sized component, typically has a thickness of about 200 μm (so-called 0402 size), which is very large in comparison to the thickness of commonly used flexible boards which typically ranges from 80 μm to 100 μm. For this reason, when a pressure is applied from the upper surface, a crack forms in the chip component, making temperature detection impossible.

SUMMARY OF THE INVENTION

In view of the above-mentioned circumstances, preferred embodiments of the present invention provide a temperature sensor and a temperature sensor attaching structure, which make it possible to directly detect the heat of a detection object without compromising the flexibility of the flexible board.

A temperature sensor according to a preferred embodiment of the present invention includes a flexible thermistor that includes a metal base, a thermistor layer that is located on the metal base, the thermistor layer being thinner than the metal base, and a pair of split electrodes that are located on the thermistor layer; and a flexible board that includes a base layer, a wiring conductor layer that is located on the base layer, and a cover layer that is stacked over the base layer and covers the wiring conductor layer.

The cover layer includes an opening through which a portion of the wiring conductor layer is exposed.

The flexible thermistor is received within the opening, and the split electrodes of the flexible thermistor are electrically connected to the wiring conductor layer that is exposed from the opening.

A height of a surface of the cover layer preferably is the same or substantially the same as a height of an exposed surface of the flexible thermistor.

Preferably, the height of the surface of the cover layer becomes the same or substantially the same as the height of the exposed surface of the flexible thermistor when the temperature sensor is pressed in a thickness direction with respect to the flexible board.

Preferably, the height of the exposed surface of the flexible thermistor is within a range of about ±20% with respect to the height of the surface of the cover layer.

A temperature sensor attaching structure according to a preferred embodiment of the present invention is a temperature sensor attaching structure including the temperature sensor according to any one of the preferred embodiments of the present invention described above, in which the temperature sensor is arranged so that the metal base of the flexible thermistor is in close proximity to or contacts with a temperature detection object.

According to various preferred embodiments of the present invention, the stress load applied to the flexible thermistor when the thermistor is brought into contact with the temperature detection object is significantly reduced, so as to reduce breakage of the thermistor element as much as possible. Moreover, because the temperature sensor has high resistance to stress load, it is also possible to press the temperature sensor against the temperature detection object into intimate contact with the temperature detection object, so as to effectively improve temperature detection accuracy.

Because the temperature sensor has flexibility, even if the outer surface of the temperature detection object with which the temperature sensor comes into contact is a curved surface, the temperature sensor is arranged along the curved surface, and detects the temperature of the temperature detection object with high thermal responsiveness. Further, because the stress load on the temperature detection object is reduced, damage to the temperature detection object can be prevented.

Because the temperature sensor has high resistance to stress load, it is also possible to press the temperature sensor against the temperature detection object into intimate contact with the temperature detection object, so as to effectively improve temperature detection accuracy.

The above and other elements, features, steps, characteristics and advantages of the present invention will become more apparent from the following detailed description of the preferred embodiments with reference to the attached drawings.

SUMMARY OF THE INVENTION

FIG. 20 illustrates the temperature rise curve of a temperature detection object.

FIGS. 21A and 21B illustrate the relationship between crack rate and temperature detection accuracy, with respect to the difference between the total thickness of the flexible board and the height of the flexible thermistor 1A.

FIGS. 22A and 22B illustrate the relationship between crack rate and temperature detection accuracy, with respect to the difference between the total thickness of the flexible board and the height of the flexible thermistor 1A, for each of temperature sensors that differ in the total thickness of the flexible board from the example illustrated in FIGS. 21A and 21B.

FIG. 23 is a cross-sectional view of a sensor unit 30 that detects the temperature of a power generating element disclosed in Japanese Unexamined Patent Application Publication No. 2010-015914.

DETAILED DESCRIPTION OF THE PREFERRED EMBODIMENTS

First Preferred Embodiment

The configuration of a flexible thermistor provided to a temperature sensor according to a first preferred embodiment of the present invention will be described first.

Figure 1A:
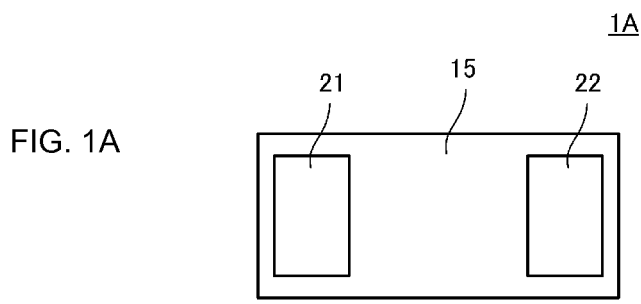
FIG. 1A is a plan view of a flexible thermistor.
Figure 1B:
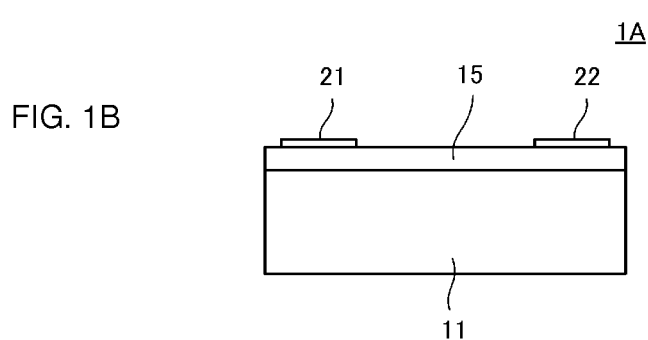
FIG. 1B is a front view of the flexible thermistor.

FIG. 1A is a plan view of a flexible thermistor, and FIG. 1B is a front view of the flexible thermistor. A flexible thermistor 1A includes a metal base 11, a thermistor layer 15 that is located on the metal base 11, and a pair of split electrodes 21 and 22 that are located on the thermistor layer 15. The metal base 11 is obtained preferably by firing a metal powder paste made into a sheet-shaped form. The thermistor layer 15 is obtained by preferably firing a ceramic slurry made into a sheet-shaped form. The split electrodes 21 and 22 are obtained preferably by firing an electrode material paste. The metal powder paste in a sheet-shaped form, the ceramic slurry in a sheet-shaped form, and the electrode paste are fired integrally with one another. It suffices that at least the metal base 11 and the thermistor layer 15 are fired integrally.

The thickness of the metal base 11 preferably is about 10 µm to 80 µm, the thickness of the thermistor layer 15 preferably is about 1 µm to 10 µm, the thickness of each of the split electrodes 21 and 22 preferably is about 0.1 µm to 10 µm, and the thickness of the entire flexible thermistor 1A preferably is about 10 µm to 100 µm, for example. Because the thickness of the thermistor layer 15 is small in comparison to the thickness of the metal base 11 as described above, and hence the ratio at which the metal base 11 exists in the entire flexible thermistor 1A is high, flexibility can be imparted to the thermistor.

As the thermistor layer 15, various ceramic materials containing a suitable amount of Mn, Ni, Fe, Ti, Co, Al, Zn, or the like in an arbitrary combination can be used as a starting material, for example. Although mixing is performed by using an oxide of the transmission metal element mentioned above, a carbonate or hydride of the above-mentioned element may be used, for example. As each of the metal base 11 and the split electrodes 21 and 22, a single noble metal such as Ag, Pd, Pt, or Au, or a single base metal such as Cu, Ni, Al, W, or Ti, or further, an alloy containing these metals can be used, for example.

Figure 2:
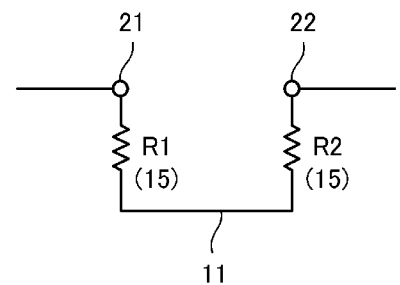
FIG. 2 illustrates an equivalent circuit of the flexible thermistor 1A.

FIG. 2 illustrates an equivalent circuit of the flexible thermistor 1A. Each of the split electrodes 21 and 22 serves as an input/output terminal. Resistors R1 and R2 are defined by the thermistor layer 15, and are electrically connected in series via the metal base 11. That is, a thermistor circuit includes the resistors R1 and R2 defined by the thermistor layer 15 sandwiched in the thickness direction between the split electrodes 21 and 22 and the metal base 11.

Figure 3:
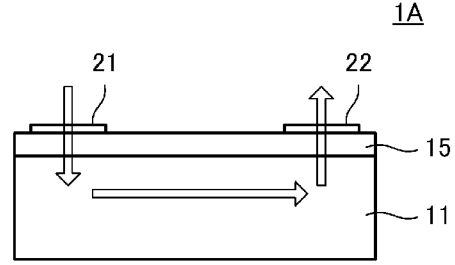
FIG. 3 illustrates the path of current that flows through the flexible thermistor 1A.
Figure 4A:
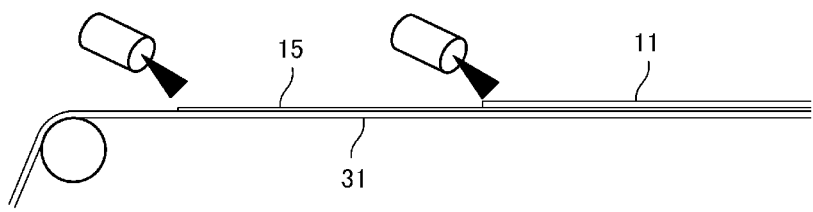
FIGS. 4A-4E illustrate a non-limiting example of steps of a manufacturing method for the flexible thermistor 1A.
Figure 4B:
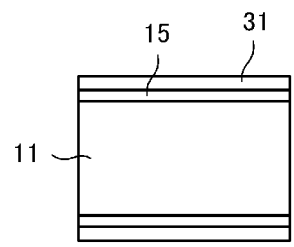
Figure 4C:
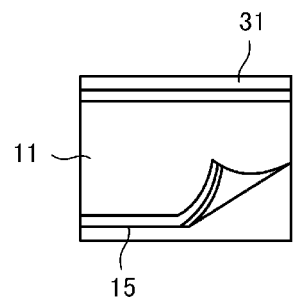
Figure 4D:
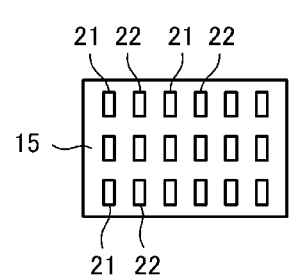
Figure 4E:
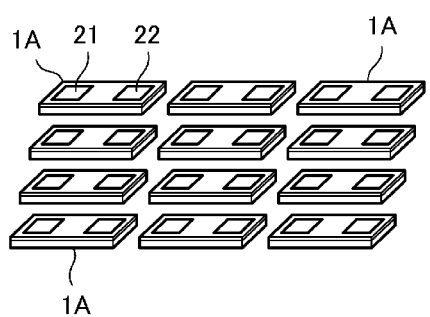

FIG. 3 illustrates the path of current that flows through the flexible thermistor 1A. Because the split electrodes 21 and 22 are located on the surface of the thermistor layer 15, as indicated by arrows in FIG. 3, current flows along a path passing through the portion of the thermistor layer 15 in contact with each of the split electrodes 21 and 22, and the metal base 11. Although the flexible thermistor 1A is not prone to cracking or the like because of its flexibility, in a case where excessive stress is applied locally, there is a possibility that a crack may develop in the central portion of the thermistor layer 15. However, as another advantage of the structure of the flexible thermistor 1A according to a preferred embodiment of the present invention, even if a crack develops in the central portion of the thermistor layer 15, no current passes through this portion, and therefore such a crack does not affect the electrical characteristics of the thermistor.

FIGS. 4A-4E illustrate a non-limiting example of a manufacturing method for the flexible thermistor 1A.

First, as the raw material of the thermistor layer 15, an oxide of Mn—Ni—Fe—Ti is weighed so as to obtain a predetermined composition, and is wet-ground sufficiently with a ball mill using a grinding material such as zirconia, followed by calcination at a predetermined temperature to obtain ceramic powder.

An organic binder is added to the ceramic powder, followed by wet-mixing to obtain a slurry. The obtained slurry is applied onto a carrier film 31 made of PET, and a ceramic green sheet that becomes the thermistor layer 15 with a thickness after firing of 1 μm to 10 μm is obtained by doctor blading. A metal base paste mainly containing Ag—Pd is applied onto this ceramic green sheet, and the metal base sheet 11 that becomes a metal base with a thickness after firing of 10 μm to 100 μm is formed by doctor-blading. The carrier film 31, the ceramic green sheet 15, and the metal base sheet 11 are cut into dimensions that form a mother sheet to obtain a plurality of thermistors (see FIG. 4B), and the ceramic green sheet 15 and the metal base sheet 11 are peeled from the film (see FIG. 4C). Thereafter, the Ag—Pd paste is screen printed on the ceramic green sheet 15 to form the split electrodes 21 and 22 (see FIG. 4D).

Next, each mother sheet with the split electrodes 21 and 22 formed thereon is cut to obtain a plurality of thermistors (see FIG. 4E), and after the thermistor is accommodated in a case, or a saggar made of zirconia, and subjected to binder removal treatment, the resulting thermistor is fired at a predetermined temperature (for example, 900° C. to 1300° C.)

Through the above steps, the flexible thermistor 1A including the metal base 11, the thermistor layer 15, and the split electrodes 21 and 22 is obtained.

Although doctor blading is common as a method for forming the metal base 11 and the thermistor layer 15 into a sheet-shaped form, screen printing, gravure printing, or ink jet method may be used. The split electrodes 21 and 22 may be formed by screen printing, sputtering, evaporation, or the like.

Figure 5A:
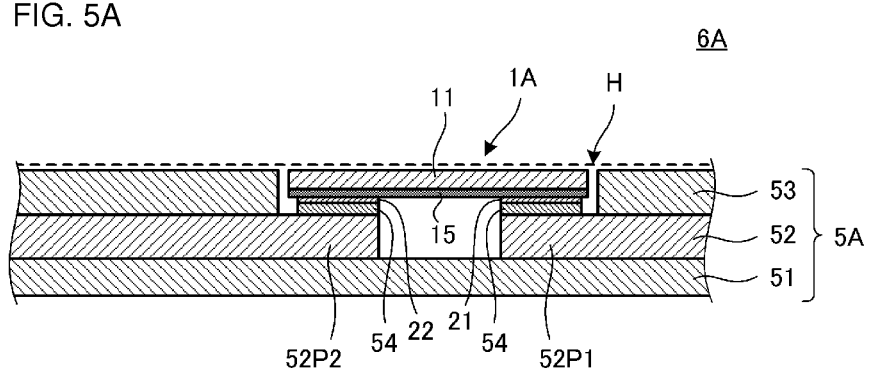
FIG. 5A is a cross-sectional view illustrating a temperature sensor 6A according to a first preferred embodiment of the present invention.

FIG. 5A is a cross-sectional view illustrating a temperature sensor 6A according to the first preferred embodiment. The temperature sensor 6A has a structure in which the flexible thermistor 1A is mounted on a flexible board 5A. The flexible board 5A includes a base layer 51, a wiring conductor layer 52 that is located on the base layer 51, and a cover layer 53 that is stacked over the base layer 51 and covers the wiring conductor layer 52.

Figure 5B:
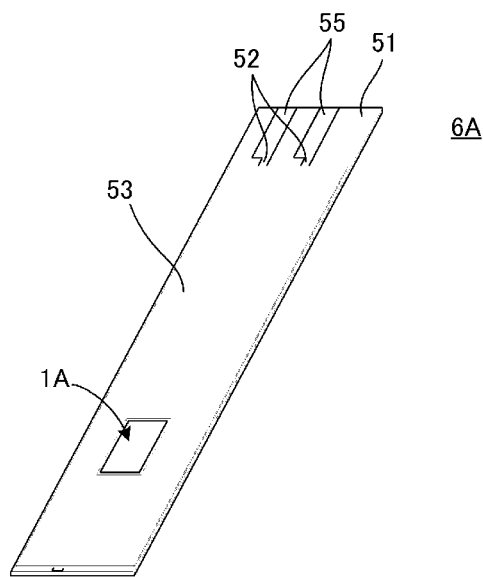
FIG. 5B is a perspective view of the temperature sensor 6A.

FIG. 5B is a perspective view of the temperature sensor 6A. The temperature sensor 6A is in a ribbon-shaped form. An external connection terminal 55 for connection to an external temperature detecting circuit is located at one end of the wiring conductor layer 52 located on the base layer 51 of the temperature sensor 6A. The external connection terminal 55 is in electrical continuity with each of the split electrodes 21 and 22 of the flexible thermistor 1A via the wiring conductor layer 52.

The base layer 51 is preferably a film of polyimide or solder resist material with a thickness of, for example, about 10 μm to about 50 μm (for example, about 30 μm). The wiring conductor layer 52 preferably is a wire made of a conductive foil such as Cu with a thickness of, for example, about 5 μm to about 60 μm (for example, about 35 μm). The wiring conductor layer 52 is joined to the base layer 51 directly or via an adhesive layer. The cover layer 53 is a film of polyimide or solder resist material with a thickness of, for example, about 7 μm to about 250 μm (for example, about 40 μm).

A portion of the wiring conductor layer 52 is defined by each of connecting portions 52P1 and 52P2 to connect the split electrodes 21 and 22, respectively, of the flexible thermistor 1A. A rectangular or substantially rectangular opening H is formed in the cover layer 53. The opening H exposes the connecting portions 52P1 and 52P2, and receives the flexible thermistor 1A. The dimensions of the opening H are preferably the same as or somewhat larger than the dimensions of the flexible thermistor 1A.

The flexible thermistor 1A is received within the opening H. The split electrodes 21 and 22 of the flexible thermistor 1A are mounted onto the connecting portions 52P1 and 52P2, respectively, of the wiring conductor layer 52 by reflow soldering. That is, the split electrodes 21 and 22 are connected to the connecting portions 52P1 and 52P2, respectively, via a solder layer 54. The thickness of the solder layer 54 preferably is about 15 μm, the thickness of each of the split electrodes 21 and 22 of the flexible thermistor 1A preferably is about 5 μm, and the combined thickness of the thermistor layer 15 and the metal base 11 of the flexible thermistor 1A preferably is about 20 μm, for example. Therefore, the total combined thickness of the solder layer 54, the split electrodes 21 and 22, the thermistor layer 15, and the metal base 11 (the thickness from the exposed surface of the wiring conductor layer 52 to the exposed surface of the thermistor layer 15) preferably is about 40 μm, which is substantially equal to the thickness of the cover layer 53 of about 40 μm, for example.

According to the structure illustrated in FIGS. 5A and 5B, as indicated by broken lines in the drawing, the height of the surface of the cover layer 53 and the height of the exposed surface of the flexible thermistor 1A (the outer surface of the metal base 11 illustrated in FIGS. 1A and 1B) can be made to coincide. In other words, the thickness from the outer surface (back side) of the base layer 51 to the outer surface (front side) of the cover layer 53 is preferably the same or substantially the same as the thickness from the outer surface (back side) of the base layer 51 to the exposed surface of the flexible thermistor 1A. Because the height of the surface of the cover layer 53 and the height of the exposed surface of the flexible thermistor 1A are made to substantially coincide, and a flexible thermistor having flexibility is used as the thermistor, the cover layer 53 and a temperature detecting surface, which is the surface of the flexible thermistor 1A, can be brought into intimate contact with a temperature detection object along the temperature detection object. Moreover, the metal base of the flexible thermistor 1A comes into direct contact with the temperature detection object in that state. Therefore, high thermal responsiveness is achieved even in a case where the temperature detection object generates only a small amount of heat, and it is possible to improve the accuracy of temperature detection in comparison to a case where the thermistor layer is in direct contact with the temperature detection object.

While the thickness from the surface of the wiring conductor layer 52 to the exposed surface of the thermistor layer 15 is preferably the same in the above-mentioned example, this thickness may not necessarily be completely the same, but it suffices that the thickness be substantially the same.

Second Preferred Embodiment

Figure 6:
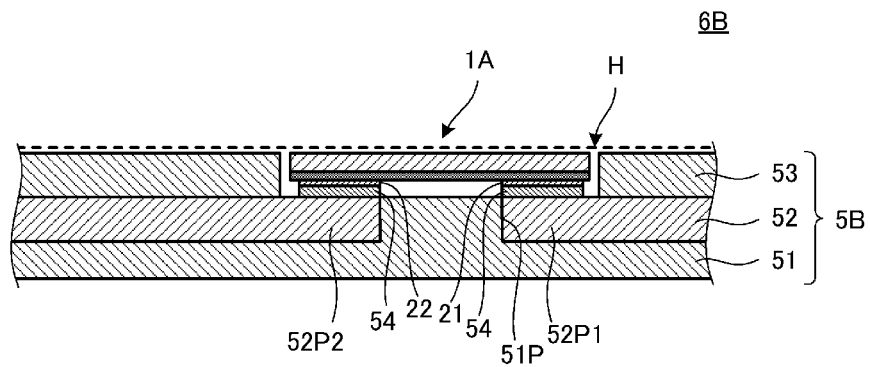
FIG. 6 is a cross-sectional view of a temperature sensor 6B according to a second preferred embodiment of the present invention.

FIG. 6 is a cross-sectional view of a temperature sensor 6B according to a second preferred embodiment of the present invention. The temperature sensor 6B has a structure in which the flexible thermistor 1A is mounted on a flexible board 5B. The flexible board 5B includes the base layer 51, the wiring conductor layer 52 that is located on the base layer 51, and the cover layer 53 that is stacked over the base layer 51 and covers the wiring conductor layer 52.

In the example illustrated in FIG. 6, unlike the flexible board 5A illustrated in FIG. 5A with reference to the first preferred embodiment, the mounting surface of the flexible thermistor 1A is flat. That is, the thickness of the base layer 51 is made larger for the area where the wiring conductor layer 52 is not located. At the position of the cross section illustrated in FIG. 6, the surface of the base layer 51 on which the flexible thermistor 1A is mounted includes a projection 51P. The projection 51P preferably has a thickness equal or substantially equal to the thickness of the wiring conductor layer 52.

According to the structure illustrated in FIG. 6, the base layer 51 includes the projection 51P having a thickness substantially equal to the thickness of the wiring conductor layer 52. Consequently, the strength of the temperature sensor 6B can be increased, and concentration of stress on the mounting area of the flexible thermistor 1A when in use of the temperature sensor 6B is reduced, thus further reducing stress caused by pressing of the temperature sensor 6B against the temperature detection object.

Third Preferred Embodiment

Figure 7:
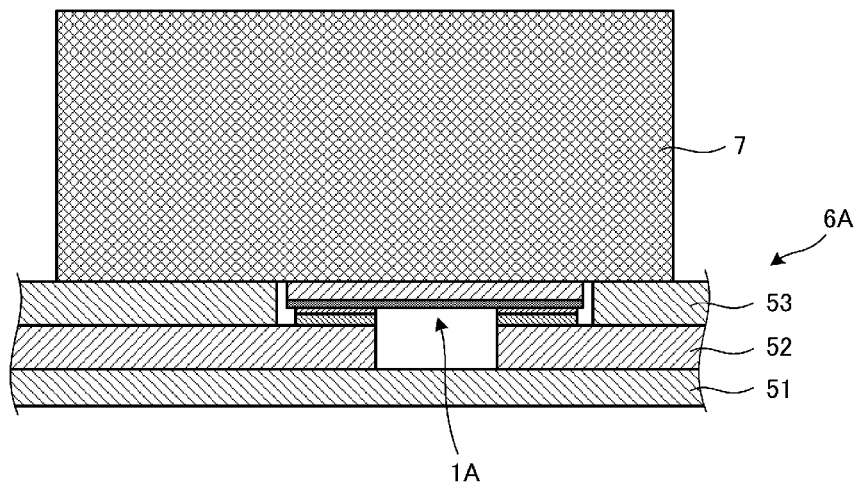
FIG. 7 is a cross-sectional view illustrating a temperature sensor attaching structure according to a third preferred embodiment of the present invention.

FIG. 7 is a cross-sectional view illustrating a temperature sensor attaching structure according to a third preferred embodiment of the present invention. In FIG. 7, the temperature sensor 6A preferably has the same structure as that described above with reference to the first preferred embodiment. The temperature detection object 7 is, for example, a heat generating element. The temperature sensor 6A is affixed to the temperature detection object 7. The flexible thermistor 1A comes into contact with or close proximity to the temperature detection object 7 in this state. That is, of surfaces of the temperature sensor 6A, the surface through which the flexible thermistor 1A is exposed is affixed to the temperature detection object 7.

As illustrated in FIG. 5, the height of the flexible thermistor 1A substantially coincides with the height of the surface of the cover layer 53, and moreover, the flexible thermistor 1A itself has flexibility. Therefore, the stress load applied to the flexible thermistor 1A when the flexible thermistor 1A comes into contact with the temperature detection object 7 can be reduced, so as to prevent breakage (cracking) of the thermistor. In addition, it is also possible to press the temperature sensor 6A against the temperature detection object 7, and bring the flexible thermistor 1A into contact with the temperature detection object 7 along the shape of the temperature detection object 7, so as to obtain high responsiveness.

Even if the height of the surface of the cover layer 53 and the height of the surface of the flexible thermistor 1A differ from each other in a state before the temperature sensor 6A is pressed against the temperature detection object 7, the above-mentioned effect can be obtained as long as the thicknesses of the cover layer 53 and flexible thermistor 1A become substantially equal as a result of deformation caused by pressing of the temperature sensor 6A.

Preferably, the height of the exposed surface of the flexible thermistor 1A is within a range of about ±20% with respect to the height of the surface of the cover layer 53. That is, the above-mentioned effect can be generally obtained as long as the following relationship holds: the height of the surface of the cover layer 53×0.8≤the height of the exposed surface of the flexible thermistor≤the height of the surface of the cover layer 53×1.2, for example.

Figure 8:
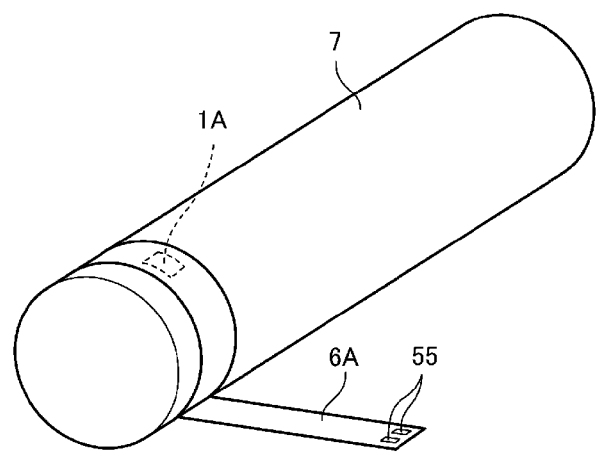
FIG. 8 is a perspective view illustrating a temperature sensor attaching structure in a case where a temperature detection object 7 is a cylindrical secondary battery.

FIG. 8 is a perspective view illustrating a temperature sensor attaching structure in a case where the temperature detection object 7 is a cylindrical secondary battery. The temperature sensor 6A is in a ribbon-shaped form, with the flexible thermistor 1A being circumferentially wound around the temperature detection object 7 that is a secondary battery so as to be in contact with the temperature detection object 7. The external connection terminal 55 for connection to an external temperature detecting circuit is located at one end of the temperature sensor 6A. The external connection terminal 55 is in electrical continuity with each of the split electrodes of the flexible thermistor 1A via the wiring conductor layer 52.

Because the temperature sensor 6A according to various preferred embodiments of the present invention has flexibility as a whole, the temperature sensor 6A has high resistance to the temporary bending stress applied when arranging the sensor, and can be arranged (affixed) as it is on a curved surface as illustrated in FIG. 8.

Fourth Preferred Embodiment

Figure 9:
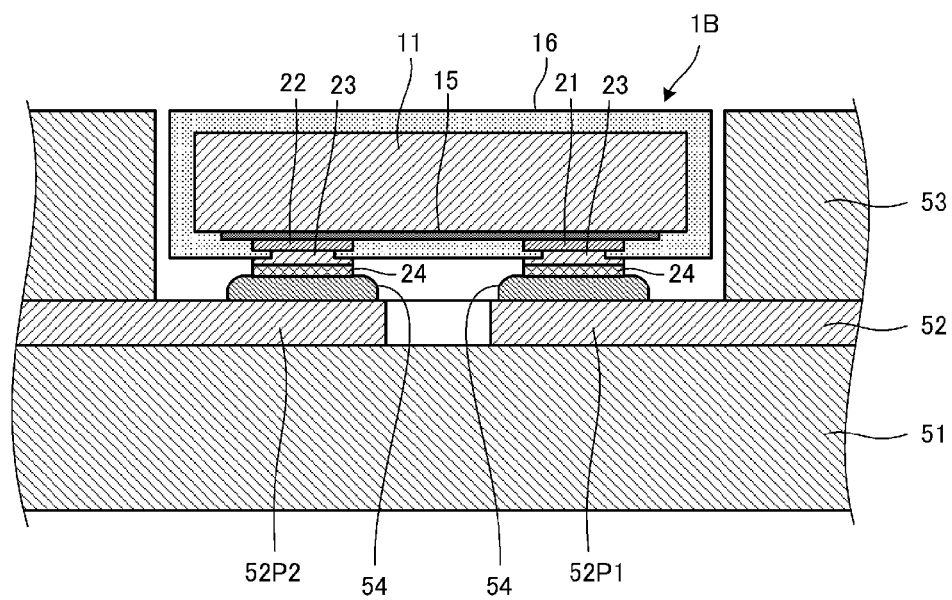
FIG. 9 is a cross-sectional view illustrating a temperature sensor according to a fourth preferred embodiment of the present invention.

FIG. 9 is a cross-sectional view illustrating a temperature sensor according to a fourth preferred embodiment of the present invention. In this example, in a flexible thermistor 1B, a protective layer 16 having electrical insulating property is arranged around the flexible thermistor illustrated in FIG. 1, and a Ni plating layer 23 and a Sn plating layer 24 are located on the split electrodes 21 and 22, respectively. The flexible thermistor 1B is mounted onto the connecting portions 52P1 and 52P2, respectively, of the flexible board via the solder 54 by reflow soldering.

Because the metal base 11 is applied with an insulating coating in this way, there is no fear of electrically conductive components or wires (not illustrated) being brought into electrical continuity with the metal base 11. By covering the entire surface of the thermistor excluding the split electrodes 21 and 22 by the protective layer 16 that is an insulating layer in this way, the present invention can be applied as it is even to a case where the temperature detection object is electrically connected to a given circuit.

Fifth Preferred Embodiment

Figure 10:
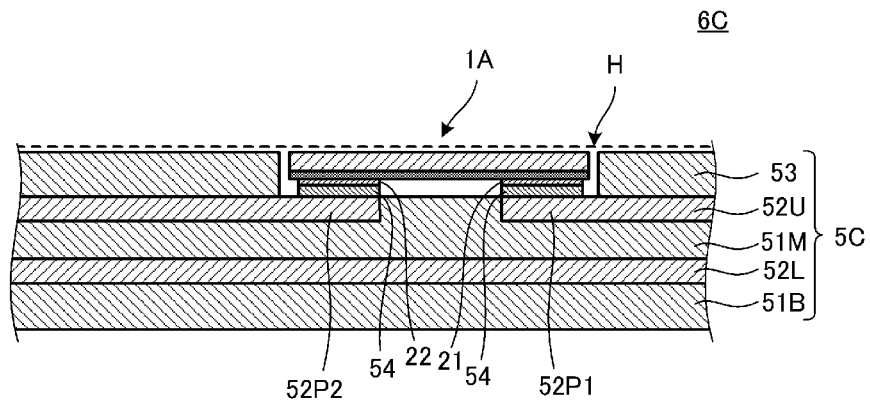
FIG. 10 is a cross-sectional view illustrating a temperature sensor 6C according to a fifth preferred embodiment of the present invention.

FIG. 10 is a cross-sectional view illustrating a temperature sensor 6C according to a fifth preferred embodiment of the present invention. In this example, a flexible board 5C includes a lower base layer 51B, a lower wiring conductor layer 52L, an inner base layer 51M, an upper wiring conductor layer 52U, and the cover layer 53. The temperature sensor 6C is preferably the same as the temperature sensor 6B according to the second preferred embodiment except for that the temperature sensor 6C includes two base layers and two wiring conductor layers.

A plurality of base layers and wiring conductor layers may be provided in this way. Further, a plurality of cover layers may be provided.

Sixth Preferred Embodiment

A sixth preferred embodiment of the present invention relates to a RFID tag with temperature sensor.

Figure 11A:
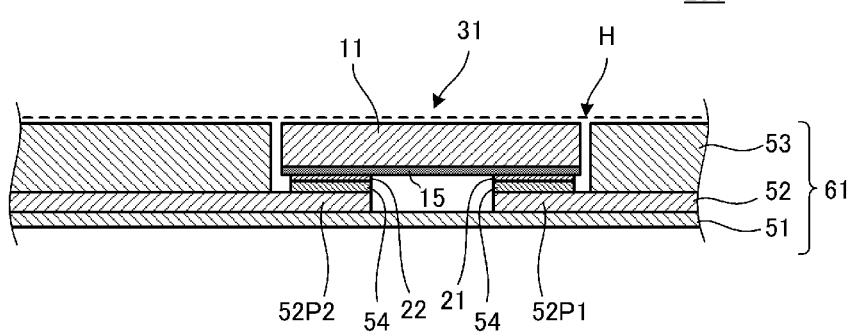
FIG. 11A is a partial cross-sectional views of a RFID tag 201 according to a sixth preferred embodiment of the present invention.

FIG. 11A is a partial cross-sectional view of a RFID tag 201 according to the sixth preferred embodiment. A flexible thermistor 31 is mounted on a flexible board 61 that is a RFID board. The flexible board 61 includes the base layer 51, the wiring conductor layer 52 that is located on the base layer 51, and the cover layer 53 that is stacked over the base layer 51 and covers the wiring conductor layer 52.

Figure 11B:
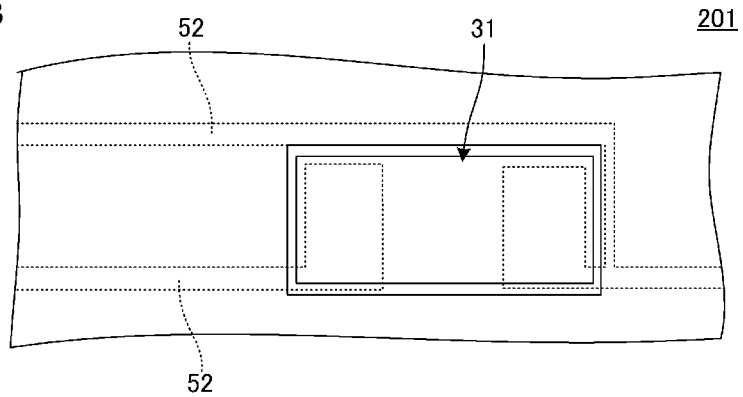
FIG. 11B is a partial plan view of the RFID tag 201.

FIG. 11B is a partial plan view of the RFID tag 201. The RFID tag 201 is in a short ribbon-shaped form.

The base layer 51 preferably is a film of polyimide or solder resist material with a thickness of, for example, about 10 μm to about 50 μm (for example, about 30 μm). The wiring conductor layer 52 preferably is a wire made of a conductive foil such as Cu with a thickness of, for example, about 5 μm to about 60 μm (for example, about 35 μm). The wiring conductor layer 52 is joined to the base layer 51 directly or via an adhesive layer. The cover layer 53 preferably is a film of polyimide or solder resist material with a thickness of, for example, about 7 μm to about 250 μm (for example, about 40 μm).

A portion of the wiring conductor layer 52 is provided as each of the connecting portions 52P1 and 52P2 to connect the split electrode 21 and 22, respectively, of the flexible thermistor 31. The rectangular or substantially rectangular opening H is provided in the cover layer 53. The opening H exposes the connecting portions 52P1 and 52P2, and receives the flexible thermistor 31. The dimensions of the opening H preferably are the same as or somewhat larger than the dimensions of the flexible thermistor 31.

The flexible thermistor 31 is received within the opening H. The split electrodes 21 and 22 of the flexible thermistor 31 are mounted onto the connecting portions 52P1 and 52P2, respectively, of the wiring conductor layer 52 by reflow soldering. That is, the split electrodes 21 and 22 are connected to the connecting portions 52P1 and 52P2, respectively, via the solder layer 54. The thickness of the solder layer 54 preferably is about 15 μm, the thickness of each of the split electrodes 21 and 22 of the flexible thermistor 31 preferably is about 5 μm, and the combined thickness of the thermistor layer 15 and the metal base 11 of the flexible thermistor 31 preferably is about 20 μm, for example. Therefore, the total combined thickness of the solder layer 54, the split electrodes 21 and 22, the thermistor layer 15, and the metal base 11 (the thickness from the exposed surface of the wiring conductor layer 52 to the exposed surface of the thermistor layer 15) preferably is about 40 μm, which is substantially equal to the thickness of the cover layer 53 of about 40 μm, for example.

According to the structure illustrated in FIG. 11A, as indicated by broken lines in the drawing, the height of the surface of the cover layer 53 and the height of the exposed surface of the flexible thermistor 31 (the outer surface of the metal base 11 illustrated in FIGS. 1A and 1B) can be made to coincide. In other words, the thickness from the outer surface (back side) of the base layer 51 to the outer surface (front side) of the cover layer 53 preferably is substantially the same as the thickness from the outer surface (back side) of the base layer 51 to the exposed surface of the flexible thermistor 31. Because the height of the surface of the cover layer 53 and the height of the exposed surface of the flexible thermistor 31 are preferably made to substantially coincide, and a flexible thermistor having flexibility is used as the thermistor, the cover layer 53 and a temperature detecting surface, which is the surface of the flexible thermistor 31, can be brought into intimate contact with a temperature detection object along the temperature detection object. Moreover, the metal base of the flexible thermistor 31 comes into direct contact with the temperature detection object in that state. Therefore, high thermal responsiveness is achieved even in a case where the temperature detection object generates only a small amount of heat, and it is possible to improve the accuracy of temperature detection in comparison to a case where the thermistor layer is in direct contact with the temperature detection object.

While the thickness from the surface of the wiring conductor layer 52 to the exposed surface of the flexible thermistor 31 preferably is the same in the above-mentioned example, this thickness may not necessarily be completely the same, but it suffices that the thickness be substantially the same.

Figure 12A:
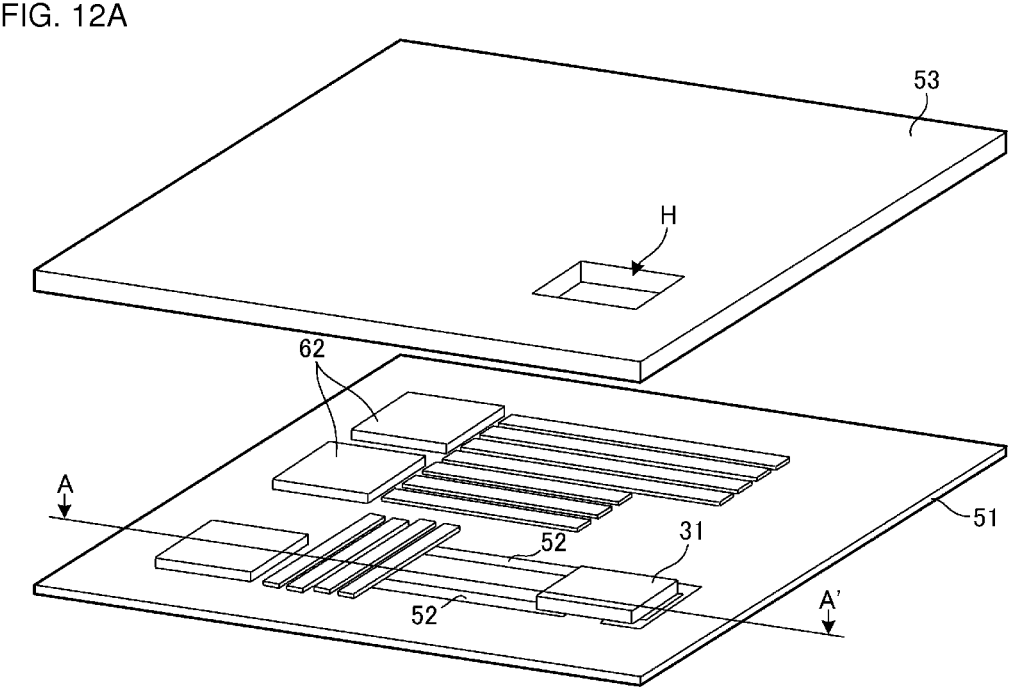
FIG. 12A is an exploded perspective view of the RFID tag 201.
Figure 12B:
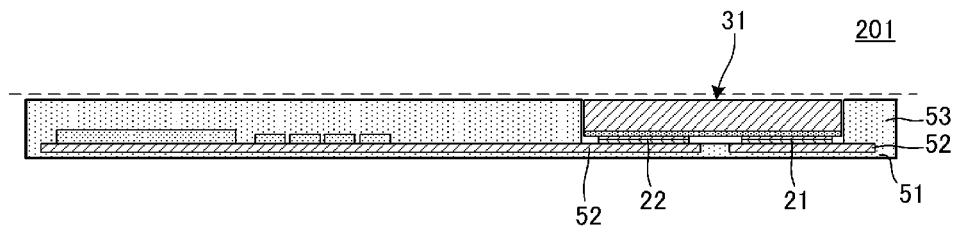
FIG. 12B is a cross-sectional view taken along a line A-A' in FIG. 12A.

FIG. 12A is an exploded perspective view of the RFID tag 201. FIG. 12B is a cross-sectional view taken along a line A-A' in FIG. 12A. In the RFID tag 201, the flexible thermistor 31 is mounted on the base layer 51 of a flexible board that serves as a RFID board, together with a RFID tag circuit component 62.

The flexible thermistor 31 is electrically connected by soldering to the wiring conductor layer 52 that is located on the upper surface of the base layer 51. In addition, electrodes of other mounting components, or other mounting components are electrically connected to the wiring conductor layer 52.

The split electrode 21, 22 side of the flexible thermistor 31 faces the base layer 51 side. The flexible thermistor 31 is in contact with or close proximity to the base layer 51 of the RFID board. In addition, the cover layer 53 is located on the wiring conductor layer 52. The opening H is provided in the cover layer 53. The flexible thermistor 31 is received within the opening so that the surface of the flexible thermistor 31 is exposed from the opening H. The flexible thermistor 31 is arranged so that the exposed surface of the flexible thermistor 31 is in contact with a temperature detection object. Therefore, the temperature of the detection object can be detected with high thermal responsiveness and high temperature detection accuracy.

As illustrated in FIG. 11A, the height of the exposed surface of the flexible thermistor 31 preferably is substantially the same as the height of the surface of the cover layer, and the flexible thermistor 31 itself has flexibility. Therefore, the stress load applied to the flexible thermistor 31 when the flexible thermistor 31 comes into contact with the base layer 51 of the flexible board can be reduced, so as to prevent breakage (cracking) of the thermistor. Moreover, because the flexible thermistor 31 is not exposed to the outside, high environmental resistance is obtained.

The RFID tag 201 illustrated in FIGS. 12A and 12B may be affixed in such a way that the lower surface of the base layer 51 of the flexible board is affixed to the temperature detection object via an adhesive sheet or the like. In addition, while the wiring conductor layer is located in the same plane as the base layer in FIG. 12B, a plurality of base layers and wiring conductor layers may be stacked, and other mounting components and the flexible thermistor 31 may not necessarily located on the same base layer surface.

Even if the height of the surface of the cover layer 53 and the height of the exposed surface of the flexible thermistor 31 that are illustrated in FIG. 11A differ from each other in a state before the flexible thermistor 31 is pressed against the temperature detection object, the above-mentioned effect can be obtained as long as the thicknesses of the cover layer 53 and flexible thermistor 31 become substantially equal owing to deformation caused by pressing of the flexible thermistor 31.

The height of the exposed surface of the flexible thermistor 31 is preferably within a range of about ±20% with respect to the height of the surface of the cover layer 53, for example. That is, the above-mentioned effect can be generally obtained as long as the following relationship holds: the height of the surface of the cover layer 53×0.8≤the height of the exposed surface of the flexible thermistor≤the height of the surface of the cover layer 53×1.2, for example.

The RFID tag described above can be used for the following example applications.

(1) To be used as a label for a food or beverage item for which temperature control is desired.

(2) To be affixed to the human body in the form of a sticker, in order to collect/control body temperature information for a certain period of time.

(3) To be affixed to a required area in the form of a sticker, as a sensor for high temperature hazardous area locations.

(4) To be embedded in the collar of a pet, or affixed to the pet in the form of a sticker, in order to measure the body temperature of the pet for the purpose of health care.

(5) To be affixed in the form of a sticker to a very narrow area where wiring is difficult, such as a printer head or engine's fuel injection pipe.

(6) To be affixed in the form of a sticker to detect the temperature of a battery such as a lithium ion secondary battery.

(7) To be affixed to a component with low heat capacity, in order to detect the ambient environment temperature.

In each of seventh to ninth preferred embodiments of the present invention that follow, a battery pack with temperature sensor will be described.

Seventh Preferred Embodiment

Figure 13A:
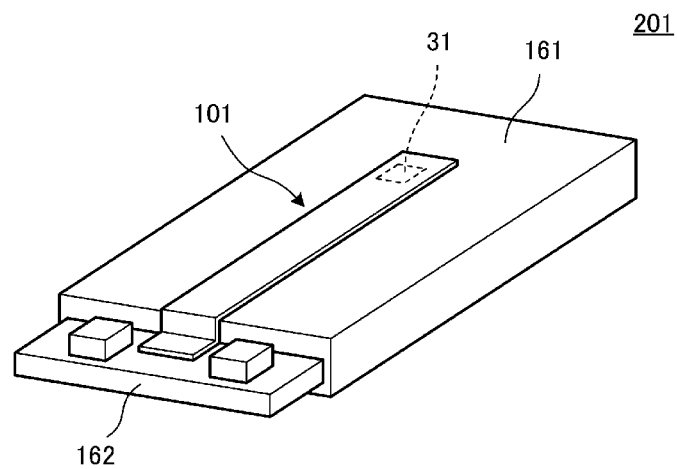
FIG. 13A is a perspective view of a battery pack with temperature sensor according to a seventh preferred embodiment of the present invention, and FIG. 13B schematically illustrates the surface of a battery.
Figure 13B:
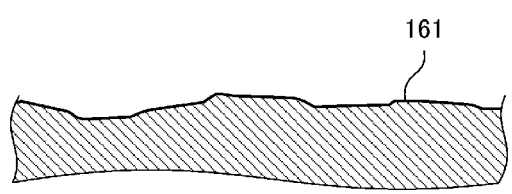

FIG. 13A is a perspective view of a battery pack with temperature sensor according to a seventh preferred embodiment of the present invention. FIG. 13B schematically illustrates the surface of a battery. A battery pack with temperature sensor 201 includes a board 162 including a charge control circuit or the like, and a temperature sensor 101, together with a battery 161. The battery 161 is a laminated battery whose outer surface has flexibility. As illustrated in FIG. 13B, the outer surface of the battery 161 is an uneven surface with no definite form. The temperature sensor 101 is affixed via an adhesive sheet or the like along the outer surface of the battery 161. Alternatively, the temperature sensor 101 may be in intimate contact with the outer surface of the battery 161 without the intermediation of an adhesive sheet or the like.

The entire structure including the battery 161, the board 162, and the temperature sensor 101 illustrated in FIG. 13A is packed with a resin film, so as to define a battery pack with temperature sensor.

The flexible thermistor 31 of the temperature sensor 101 is exposed on the battery 161 side. The flexible thermistor 31 is in contact with or close proximity to the battery 161.

As illustrated in FIG. 5A, the height of the exposed surface of the flexible thermistor 31 is substantially the same as the height of the surface of the cover layer 53, and the flexible thermistor 31 itself has flexibility. Therefore, the stress load applied to the flexible thermistor 31 when the flexible thermistor 31 comes into contact with the battery 161 can be reduced, so as to prevent breakage (cracking) of the thermistor.

Further, even though the outer surface of the battery 161 is an uneven surface as illustrated in FIG. 13B, in a state in which the temperature sensor 101 is pressed against the battery 161, the flexible thermistor 31 can be also brought into intimate contact with the outer surface of the battery 161, and therefore high responsiveness and high temperature measurement accuracy are obtained. Consequently, for example, highly accurate control becomes possible when performing a charging control or protection control in accordance with the temperature of the battery.

Generally, miniaturization is desired for batteries, and hence additional components such as temperature sensors are often arranged in a dead space. However, the temperature sensor 101 mentioned above is very thin, and hence there is a high degree of freedom in where to arrange the temperature sensor 101. Therefore, the temperature sensor 101 can be arranged at the optimum position. That is, it is possible to directly detect the temperature of the portion where heat generation is most remarkable.

Even if the height of the surface of the cover layer 53 and the height of the exposed surface of the flexible thermistor 31 differ from each other in a state before the temperature sensor 101 is pressed against the battery 161, the above-mentioned effect can be obtained as long as the thicknesses of the cover layer 53 and flexible thermistor 31 become substantially equal owing to deformation caused by pressing of the temperature sensor 101.

Preferably, the height of the exposed surface of the flexible thermistor 31 is within a range of about ±20% with respect to the height of the surface of the cover layer 53, for example. That is, the above-mentioned effect can be generally obtained as long as the following relationship holds: the height of the surface of the cover layer 53×0.8≤the height of the exposed surface of the flexible thermistor≤the height of the surface of the cover layer 53×1.2, for example.

While the seventh preferred embodiment preferably is directed to the structure in which, as the temperature sensor 101, the flexible thermistor 31 is provided to the flexible board 5A, it is also possible to arrange the flexible thermistor 31 directly on the battery 161, and draw out wires in some way.

Eighth Preferred Embodiment

Figure 14A:
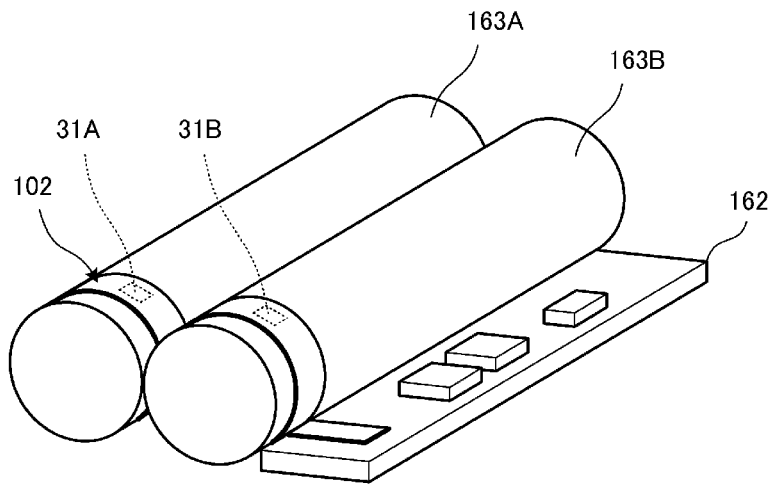
FIGS. 14A and 14B are perspective views each illustrating the internal structure of a battery pack with temperature sensor according to an eighth preferred embodiment of the present invention.
Figure 14B:
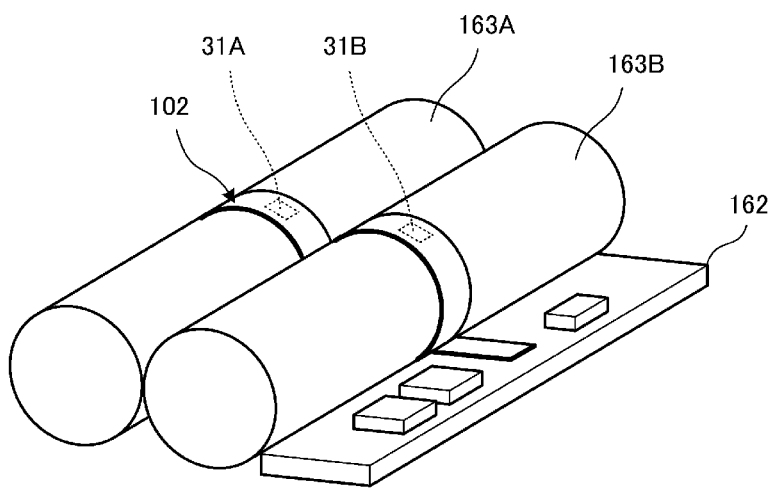

FIGS. 14A and 14B are perspective views each illustrating the internal structure of a battery pack with temperature sensor according to an eighth preferred embodiment of the present invention. In FIGS. 14A and 14B, the basic structure of a temperature sensor 102 preferably is the same as that illustrated in FIGS. 5A and 5B, but in the second preferred embodiment, two flexible thermistors 31A and 31B are arranged on a flexible board. A wiring conductor layer connected to each of the two flexible thermistors 31A and 31B is drawn out to an end portion of the flexible board. The two flexible thermistors 31A and 31B may be connected in series or in parallel and drawn out to an end portion of the flexible board.

In each of the examples in FIGS. 14A and 14B, the temperature sensor 102 is affixed along the side surfaces of two cylindrical batteries 163A and 163B. While each of the batteries 163A and 163B preferably includes a hard outer surface in the second preferred embodiment, the temperature sensor 102 is in intimate contact with the outer surfaces of the batteries 163A and 163B along the outer surfaces, and in that state, the flexible thermistors 31A and 31B come into contact with or close proximity to the batteries 163A and 163B, respectively. That is, of surfaces of the temperature sensor 102, the surfaces through which the flexible thermistors 31A and 31B are exposed are affixed to the batteries 163A and 163B, respectively.

Ninth Preferred Embodiment

Figure 15:
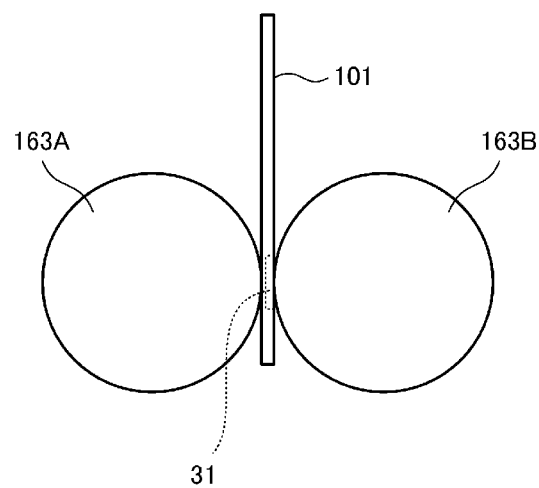
FIG. 15 illustrates batteries 163A and 163B as viewed along the axial direction.

FIG. 15 is a front view of a main portion of a battery pack according to a ninth preferred embodiment of the present invention. The batteries 163A and 163B preferably are cylindrical batteries. FIG. 15 illustrates the batteries 163A and 163B as viewed along the axial direction. The temperature sensor 101 is arranged so as to be sandwiched between the two batteries 163A and 163B. The configuration of the temperature sensor 101 preferably is the same as that illustrated in FIGS. 5A and 5B with reference to the first preferred embodiment.

This structure makes it possible to measure the temperatures of two batteries (cells) by using a single flexible thermistor. Moreover, by arranging the flexible thermistor 31 at a position where heat produced during heat generation by the batteries 163A and 163B is not easily dissipated to the outside air as it is, temperature variation can be quickly detected at a stage when the amount of heat generated is still small.

In tenth and eleventh preferred embodiments that follow, an electronic apparatus including a temperature sensor and a heat generating element will be described.

Tenth Preferred Embodiment

Figure 16:
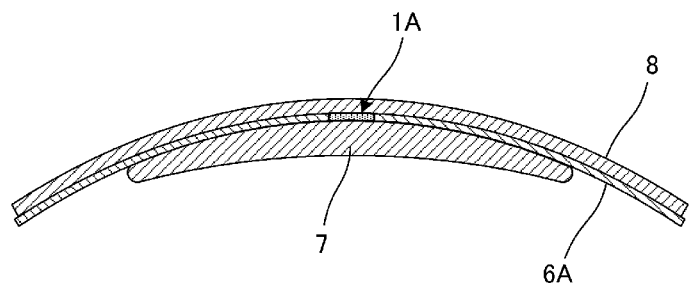
FIG. 16 is a cross-sectional view of an electronic apparatus 101 according to a tenth preferred embodiment of the present invention.

FIG. 16 is a cross-sectional view of an electronic apparatus 101 according to a tenth preferred embodiment of the present invention. The electronic apparatus 101 includes the temperature detection object 7 that is a heat generating element, a radiator plate 8 that radiates the heat of the temperature detection object 7, and the temperature sensor 6A mentioned above. The temperature detection object 7 refers to a structure that generates heat by itself, or an electronic component or the like whose temperature rises with use. The radiator plate 8 corresponds to a "radiator" recited in the claims of the present invention. The temperature detection object 7 includes a curved outer surface, and the radiator plate 8 is bowed as a whole in conformity to the curved surface of the temperature detection object 7. The temperature sensor 6A is affixed via an adhesive sheet or the like along the bowed surface of the radiator plate 8.

The flexible thermistor 1A of the temperature sensor 6A is exposed on the temperature detection object 7 side. The flexible thermistor 1A is in contact with or close proximity to the temperature detection object 7.

As illustrated in FIGS. 5A and 5B, the height of the exposed surface of the flexible thermistor 1A substantially coincides with the height of the surface of the cover layer 53, and moreover, the flexible thermistor 1A itself has flexibility. Therefore, the stress load applied to the flexible thermistor 1A when the flexible thermistor 1A comes into contact with the temperature detection object 7 can be reduced, so as to prevent breakage (cracking) of the thermistor. In addition, it is also possible to press the temperature sensor 6A against the temperature detection object 7, and bring the flexible thermistor 1A into contact with the temperature detection object 7, so as to obtain high responsiveness. Therefore, high temperature stability is obtained in a case where, for example, a feedback control is performed to keep the temperature of the heat generating element constant.

Even if the height of the surface of the cover layer 53 and the height of the surface of the flexible thermistor 1A differ from each other in a state before the temperature sensor 6A is pressed against the temperature detection object 7, the above-mentioned effect can be obtained as long as the thicknesses of the cover layer 53 and flexible thermistor 1A become substantially equal owing to deformation caused by pressing of the temperature sensor 6A.

Preferably, the height of the exposed surface of the flexible thermistor 1A is within a range of about ±20% with respect to the height of the surface of the cover layer 53, for example. That is, the above-mentioned effect can be generally obtained as long as the following relationship holds: the height of the surface of the cover layer 53×0.8≤the height of the exposed surface of the flexible thermistor≤the height of the surface of the cover layer 53×1.2, for example.

In the example illustrated in FIG. 16, the flexible thermistor 1A is arranged at the center of the area where the temperature detection object 7 and the radiator plate 8 are opposed to each other. However, in a case where the purpose of the temperature sensor 6A is to detect the temperature of the radiator plate 8, the temperature sensor 6A may be arranged so that the flexible thermistor 1A is in contact with or close proximity to a position on the radiator plate 8 where heat is to be detected.

While the example illustrated in FIGS. 5A and 5B is directed to the structure in which the flexible thermistor 1A is provided to the flexible board 5A of the temperature sensor 6A, it is also possible to arrange the flexible thermistor 1A directly on the temperature detection object 7, and draw out wires in some way.

Eleventh Preferred Embodiment

Figure 17A:
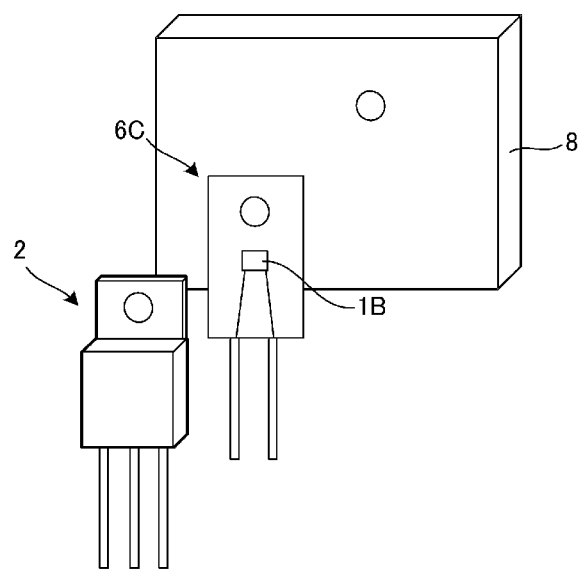
FIG. 17A is an exploded perspective view of an electronic apparatus 102 according to an eleventh preferred embodiment of the present invention.
Figure 17B:
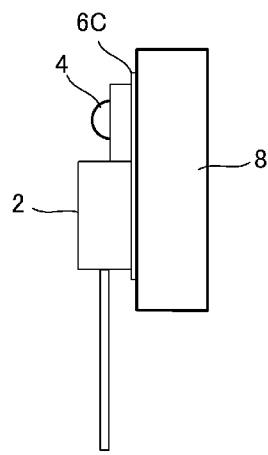
FIG. 17B is a side view of the electronic apparatus 102.

FIG. 17A is an exploded perspective view of an electronic apparatus 102 according to an eleventh preferred embodiment of the present invention, and FIG. 17B is a side view of the electronic apparatus 102. The electronic apparatus 102 includes a transistor element 2, a temperature sensor 6C that detects the temperature of the transistor element 2, and the radiator plate 8. The transistor element 2 is a power transistor, whose temperature rises with use. The radiator plate 8 radiates the heat generated by the transistor element 2. The temperature sensor 6C is sandwiched between the radiator plate 8 and the transistor element 2, and screwed into place with a screw 4.

In the temperature sensor 6C, the metal base 11 is applied with an insulating coating as illustrated in FIG. 9. Consequently, there is no fear of the radiator plate 8 or the transistor element 2 being brought into electrical continuity with the metal base 11. By covering the entire surface of the thermistor excluding the split electrodes 21 and 22 by the protective layer 16 that is an insulating layer in this way, the present invention can be applied as it is even to a case where the temperature detection object is electrically connected to a given circuit.

As already described above, by making the height of the surface of the cover layer and the exposed surface of the flexible thermistor coincide with each other, and using a flexible thermistor as the thermistor, stress load applied to the thermistor when in contact with a temperature detection object can be reduced, which provides the effect of preventing breakage of the thermistor due to cracking or the like, and improving the accuracy of temperature detection. To verify this effect, the following evaluations were made.

Figure 18:
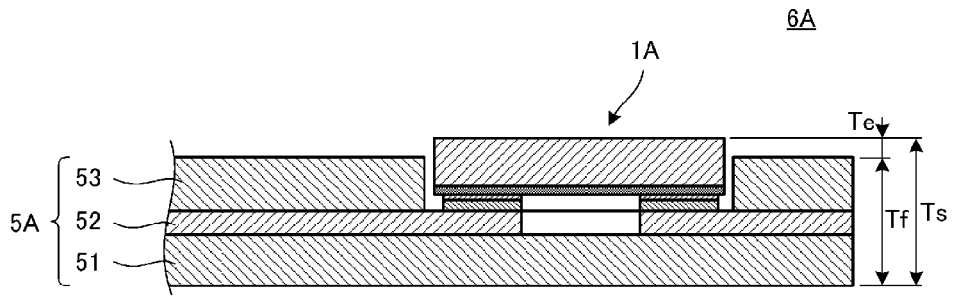
FIG. 18 illustrates the thicknesses of various portions of the flexible thermistor.
Figure 19A:
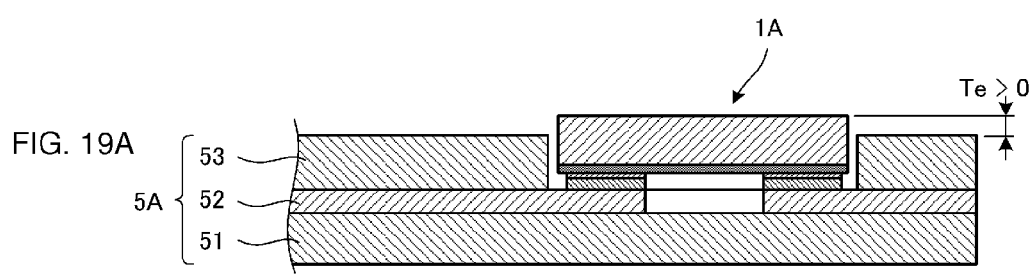
FIGS. 19A-19C illustrate examples of different relationships between the total thickness of a flexible board and the height of the flexible thermistor 1A.
Figure 19B:
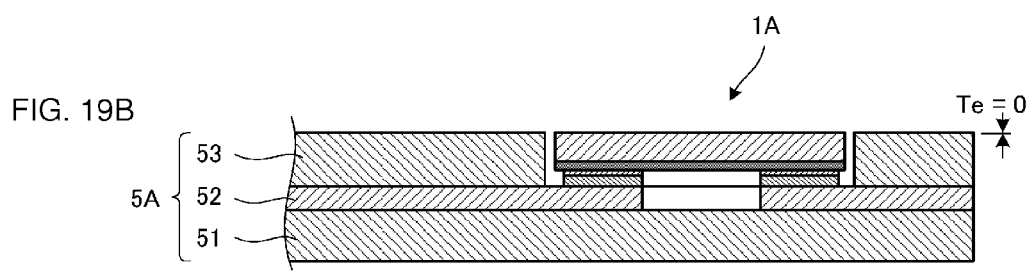
Figure 19C:
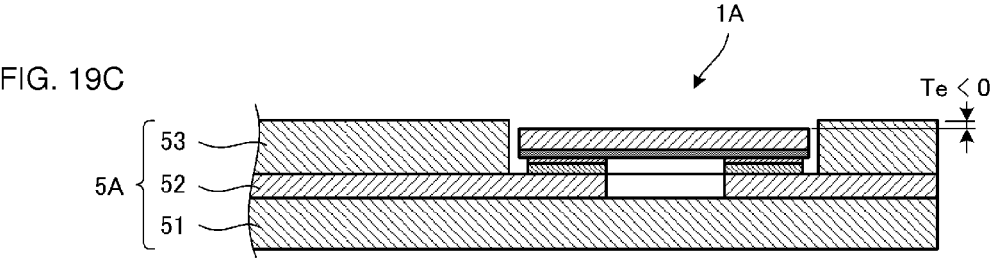

As illustrated in FIG. 18, letting Tf be the total thickness of the flexible board 5A (the height of the surface of the cover layer 53), and Ts be the total thickness of the temperature sensor 6A including the flexible thermistor 1A (the height of the exposed surface of the flexible thermistor 1A), temperature sensor samples that differ from each other in the difference Te (=Ts−Tf) between the two thicknesses were prepared. FIG. 19A illustrates a case where Te>0, FIG. 19B illustrates a case where Te=0, and FIG. 19C illustrates a case where Te<0.

Evaluation 1

Each of the above-mentioned samples was adhered to the surface of a temperature detection object with a heat-resistant tape, and stress was applied to each of the samples by performing a heat shock test that carries out 500 temperature cycles from −55° C. to 150° C. Crack rate was calculated for each of the samples after completion of the cycles, by counting cracks in the thermistor layer itself, at the interface between the thermistor layer and each of the split electrodes, and at the interface between each of the split electrodes and the solder joint.

Evaluation 2

The temperature detection object was caused to generate heat in accordance with a temperature rise curve as illustrated in FIG. 20, and the differences between the surface temperature of the temperature detection object and the temperature detected by the flexible thermistor after 60 seconds were compared.

The results in the case where the total thickness Tf of the flexible board=105 μm are illustrated in FIGS. 21A and 21B. In addition, the results in the case where the total thickness Tf of the flexible board=210 μm are illustrated in FIGS. 22A and 22B.

The results of Evaluation 1 indicate that in cases where the ratio of the total thickness Ts of the temperature sensor 6A including the flexible thermistor 1A to the total thickness Tf of the flexible board 5A is not more than 21%, the crack rate is low, and a crack-prevention effect is obtained by making the height of the surface of the cover layer coincide with the height of the exposed surface of the flexible thermistor.

In addition, the results of Evaluation 2 indicate that in cases where the ratio of the total thickness Ts of the temperature sensor 6A including the flexible thermistor 1A to the total thickness Tf of the flexible board 5A is not less than −22%, the temperature difference from the detection object is small, and a temperature detection accuracy improving effect is obtained by making the height of the surface of the cover layer coincide with the height of the exposed surface of the flexible thermistor.

The effect according to Evaluation 1 becomes even more pronounced in a case where the temperature sensor 6A is brought into contact with the detection object not by adhesion using a heat-resistant tape but by further pressing the temperature sensor 6A, or in a case where the temperature sensor 6A is arranged on a bowed surface that is subject to greater stress. While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A temperature sensor comprising:
   a flexible thermistor that includes:
      a metal base;
      a thermistor layer that is located on the metal base, the thermistor layer being thinner than the metal base; and
      a pair of split electrodes that are located on the thermistor layer; and
   a flexible board that includes:
      a base layer;
      a wiring conductor layer that is located on the base layer; and
      a cover layer that is stacked over the base layer and covers the wiring conductor layer; wherein
   the cover layer includes an opening through which a portion of the wiring conductor layer is exposed;
   the flexible thermistor is received within the opening, and the split electrodes of the flexible thermistor are electrically connected to the wiring conductor layer that is exposed from the opening; and
   a height of a surface of the cover layer is substantially the same as a height of an exposed surface of the flexible thermistor.

2. The temperature sensor according to claim 1, wherein the height of the surface of the cover layer becomes the same as the height of the exposed surface of the flexible thermistor when the temperature sensor is pressed in a thickness direction with respect to the flexible board.

3. The temperature sensor according to claim 1, wherein the height of the exposed surface of the flexible thermistor is within a range of about ±20% with respect to the height of the surface of the cover layer.

4. A temperature sensor attaching structure comprising the temperature sensor according to claim 1, wherein the temperature sensor is arranged so that the metal base of the flexible thermistor is adjacent to or contacts with a temperature detection object.

5. The temperature sensor according to claim 1, wherein the opening is rectangular or substantially rectangular.

6. The temperature sensor according to claim 1, wherein a mounting surface of the flexible thermistor is flat.

7. The temperature sensor according to claim 1, wherein a thickness of the base layer is larger at an area where the wiring conductor layer is not located.

8. The temperature sensor according to claim 1, wherein a projection is provided on a surface of the base layer and has a thickness equal to or substantially equal to a thickness of the wiring conductor layer.

9. A temperature detection object comprising the temperature sensor according to claim 1, wherein the flexible thermistor is arranged to contact the temperature detection objection.

10. The temperature detection object according to claim 9, wherein the temperature detection object is a battery and the temperature sensor is wound around the battery.

11. The temperature sensor according to claim 1, wherein the flexible thermistor includes an insulating protective layer arranged around the flexible thermistor and plating layers are provided on the split electrodes.

12. The temperature sensor according to claim 1, wherein the flexible board includes at least two of the base layer and at least two of the wiring conductor layer.

13. An RFID tag including the temperature sensor according to claim 1.

14. The RFID tag according to claim 13, wherein the flexible board is an RFID board.

15. The RFID tag according to claim 13, wherein a lower surface of the base layer of the flexible boar is affixed to a temperature detection object.

16. The RFID tag according to claim 13, wherein RFID tag is one of a label for a food item or a beverage, a sticker to be affixed to a human body or animal body, a sensor for a high temperature hazardous area, and a sticker to an object.

17. A battery pack including the temperature sensor according to claim 1.

18. The battery pack according to claim 17, wherein at least two of the flexible thermistor are provided on the flexible board.

19. The battery pack according to claim 17, further comprising at least two batteries with the temperature sensor arranged therebetween.

20. An electronic apparatus comprising:
- a heat generating element that is a temperature detection object;
- a radiator that radiates heat of the temperature detection object; and
- the temperature sensor according to claim 1 arranged to detect the heat of the temperature detection object radiated by the radiator.

\* \* \* \* \*